United States Patent
Oliaei

(10) Patent No.: US 9,634,567 B2
(45) Date of Patent: Apr. 25, 2017

(54) SENSOR DATA ACQUISITION SYSTEM WITH INTEGRATED POWER MANAGEMENT

(71) Applicant: INVENSENSE, INC., San Jose, CA (US)

(72) Inventor: Omid Oliaei, Sunnyvale, CA (US)

(73) Assignee: INVENSENSE, INC., San Jose, CA (US)

( * ) Notice: Subject to any disclaimer, the term of this patent is extended or adjusted under 35 U.S.C. 154(b) by 263 days.

(21) Appl. No.: 14/624,106

(22) Filed: Feb. 17, 2015

(65) Prior Publication Data

US 2016/0241146 A1    Aug. 18, 2016

(51) Int. Cl.

| | |
|---|---|
| G01R 1/20 | (2006.01) |
| H02M 3/158 | (2006.01) |
| G01D 11/00 | (2006.01) |
| G01L 9/00 | (2006.01) |
| G01C 19/56 | (2012.01) |
| G01P 15/08 | (2006.01) |
| H02M 3/07 | (2006.01) |
| H02M 1/00 | (2006.01) |

(52) U.S. Cl.
CPC .......... *H02M 3/158* (2013.01); *G01C 19/56* (2013.01); *G01D 11/00* (2013.01); *G01L 9/00* (2013.01); *G01P 15/08* (2013.01); *G01P 2015/0865* (2013.01); *H02M 3/07* (2013.01); *H02M 2001/0025* (2013.01)

(58) Field of Classification Search
CPC ......... H02M 3/158; H02M 2001/0025; H02M 3/07; G01D 11/00; G01P 15/00

USPC .......................................................... 307/154
See application file for complete search history.

(56) References Cited

U.S. PATENT DOCUMENTS

| | | | | |
|---|---|---|---|---|
| 6,031,362 | A * | 2/2000 | Bradley ............ | H02M 3/33561 323/267 |
| 7,064,531 | B1 * | 6/2006 | Zinn .................... | H02M 3/1584 323/268 |
| 9,213,347 | B2 * | 12/2015 | Kim ........................ | G05F 1/575 |
| 9,214,949 | B1 * | 12/2015 | Wu .......................... | H02M 3/07 |
| 2008/0054873 | A1 * | 3/2008 | Inoue ...................... | G05F 1/575 323/351 |

(Continued)

FOREIGN PATENT DOCUMENTS

EP   2495633 A1 *  8/2011  .............. G05F 1/56

*Primary Examiner* — Jared Fureman
*Assistant Examiner* — Duc M Pham
(74) *Attorney, Agent, or Firm* — Amin, Turocy & Watson, LLP

(57) ABSTRACT

A microelectromechanical systems (MEMS) sensor with an integrated power management system that performs analog to digital conversion of weak signals is provided. The MEMs sensor can include a switching regulator that steps a supply voltage down to a voltage appropriate for an analog to digital converter (A/D converter). A timing circuit is provided to generate a clock frequency for the switching regulator and the A/D converter such that the clock frequencies are harmonically related. The frequency of the voltage ripples formed by the switching regulator will match the clock frequency provided to the switching regulator. When the sampling frequency of the A/D converter is harmonically related to the voltage ripple frequencies, the aliasing frequency will fall outside a range of frequencies associated with the analog signal.

32 Claims, 9 Drawing Sheets

(56) References Cited

U.S. PATENT DOCUMENTS

2011/0150243 A1* 6/2011 Onishi .................... H02M 3/07
381/111

* cited by examiner

SENSOR DATA ACQUISITION SYSTEM WITH INTEGRATED POWER MANAGEMENT

TECHNICAL FIELD

The subject disclosure relates to microelectromechanical systems (MEMS), and more particularly, MEMS sensors with integrated power management systems.

BACKGROUND

As integrated systems reduce in size, low power consumption becomes increasingly important. For example, battery-operated devices such as mobile devices are required to have a long battery life. These devices can include power management systems that take an input voltage, and generate one or more supply voltages for different chips and components on the device. The sensors on the device are usually designed to operate over a wide supply range because the actual supply voltage used to operate the sensor may not be known to the manufacturer of the sensor. Also, different applications, designs or modes of operation may need a same sensor to operate at different voltage levels.

Linear regulator integrated with the sensors can assist with the large supply variation problem. Linear regulators provide a constant output voltage for stable operation of the sensor. Any voltage transients, due to the internal operation of the sensor or due to external disturbances, should be avoided to limit any performance degradation. Linear regulators have a low power efficiency however, particularly when there is a large difference between their input and output voltages. Switching regulators can achieve high power efficiencies while converting voltages, but switching regulators invariably introduce large voltage ripples that can be detrimental to sensor systems that are required to pick up very small signals. These signals can be one or more orders of magnitude smaller than the voltage ripples, thus the switching regulators can introduce noise that can drown out the desired signals.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In a non-limiting example, an application specific integrated circuit (ASIC) can comprise a switching regulator that receives a power supply at a first voltage and outputs a power output at a second voltage different than the first voltage. The ASIC can also comprise an analog to digital converter that converts an analog electrical signal into a digital signal, wherein the analog to digital converter receives the power output via the switching regulator. The ASIC can also include a timing circuit that controls a switching frequency of the switching regulator and a sampling frequency of the analog to digital converter such that the switching frequency and sampling frequency are harmonically related.

In another non-limiting example, a method can comprise converting a voltage of a power input from a power supply that has a first voltage to a converted power output that has a second voltage, wherein the converting is based on a switching frequency. The method can also comprise generating an analog electrical signal based on input received via a transducer and sampling the analog electrical signal at a sampling frequency and generating a digital signal based on the sampling. The method can further comprise generating a timing signal that determines the switching frequency and the sampling frequency such that the switching frequency and the sampling frequency are harmonically related.

In another non-limiting example, a micro-electromechanical systems (MEMS) sensor can comprise a transducer that generates an analog electrical signal based on input energy. The MEMs sensor can also comprise a switching regulator that receives a power supply at a first voltage and outputs a power output at a second voltage different than the first voltage. The MEMs sensor can also include a timing circuit that controls a switching frequency of the switching regulator and generates a clock output for synchronous sampling, where a sampling frequency of the clock output is such that the switching frequency is an integer multiple of the sampling frequency. The MEMs sensor can also include a pair of ports to output the clock output and the analog electrical signal.

The following description and the drawings contain certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
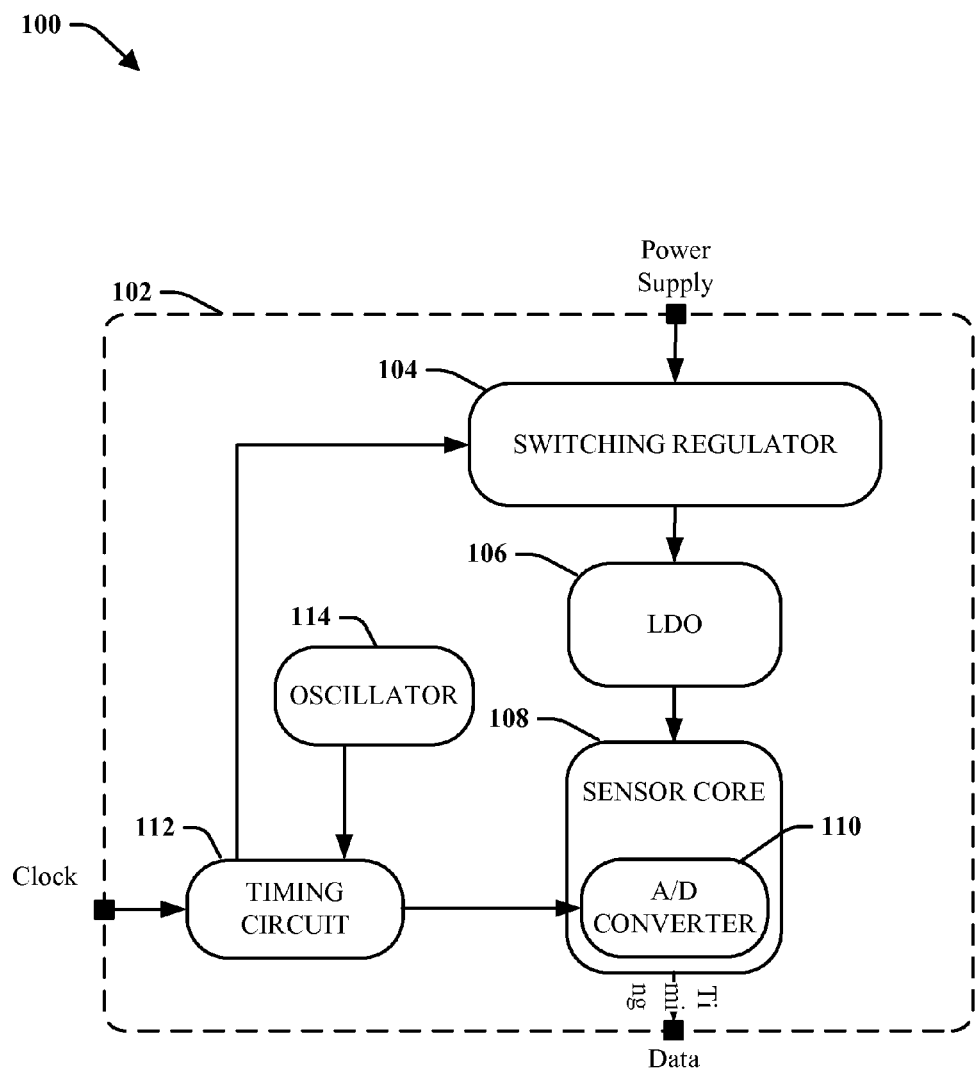
FIG. 1 depicts a non-limiting schematic diagram of an exemplary microelectromechanical systems (MEMS) sensor system with an integrated power management system according to various non-limiting aspects of the subject disclosure.

While a brief overview is provided, certain aspects of the subject disclosure are described or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, techniques and methods of the subject disclosure are described in the context of MEMS sensors. However, as further detailed below, various exemplary implementations can be applied to other areas of application specific integrated circuit board that perform analog to digital and digital to analog conversion of low amplitude signals, without departing from the subject matter described herein.

As used herein, the terms MEMS sensor, MEMS acoustic sensor(s), MEMS audio sensor(s), and the like are used interchangeably unless context warrants a particular distinction among such terms. For instance, the terms can refer to MEMS devices or components that can measure a proximity, determine acoustic characteristics, generate acoustic signals, or the like.

Additionally, terms such as "at the same time," "common time," "simultaneous," "simultaneously," "concurrently," "substantially simultaneously," "immediate," and the like are employed interchangeably throughout, unless context warrants particular distinctions among the terms. It should be appreciated that such terms can refer to times relative to each other and may not refer to an exactly simultaneously action(s). For example, system limitations (e.g., download speed, processor speed, memory access speed, etc.) can account for delays or unsynchronized actions. In other embodiments, such terms can refer to acts or actions occurring within a period that does not exceed a defined threshold amount of time.

Aspects of systems, apparatuses or processes explained in this disclosure can constitute machine-executable components embodied within machine(s), hardware components, or hardware components in combination with machine executable components, e.g., embodied in one or more computer readable mediums (or media) associated with one or more machines. Such components, when executed by the one or more machines, e.g., computer(s), computing device(s), virtual machine(s), etc., can cause the machine(s) to perform the operations described. While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

To that end, the one or more processors can execute code instructions stored in memory, for example, volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

Various embodiments provide for a MEMs sensor or ASIC, with an integrated power management system, that performs analog to digital conversion of weak signals. The MEMs sensor can include a switching regulator that steps a supply voltage down to a voltage appropriate for an analog to digital converter (A/D converter). A timing circuit is provided to generate a clock frequency for the switching regulator and the A/D converter such that the clock frequencies are harmonically related. The frequency of the voltage ripples formed by the switching regulator will match the clock frequency provided to the switching regulator. When the sampling frequency of the A/D converter is harmonically related to the voltage ripple frequencies, the aliasing frequency will fall outside a range of frequencies associated with the analog signal.

Figure 9:
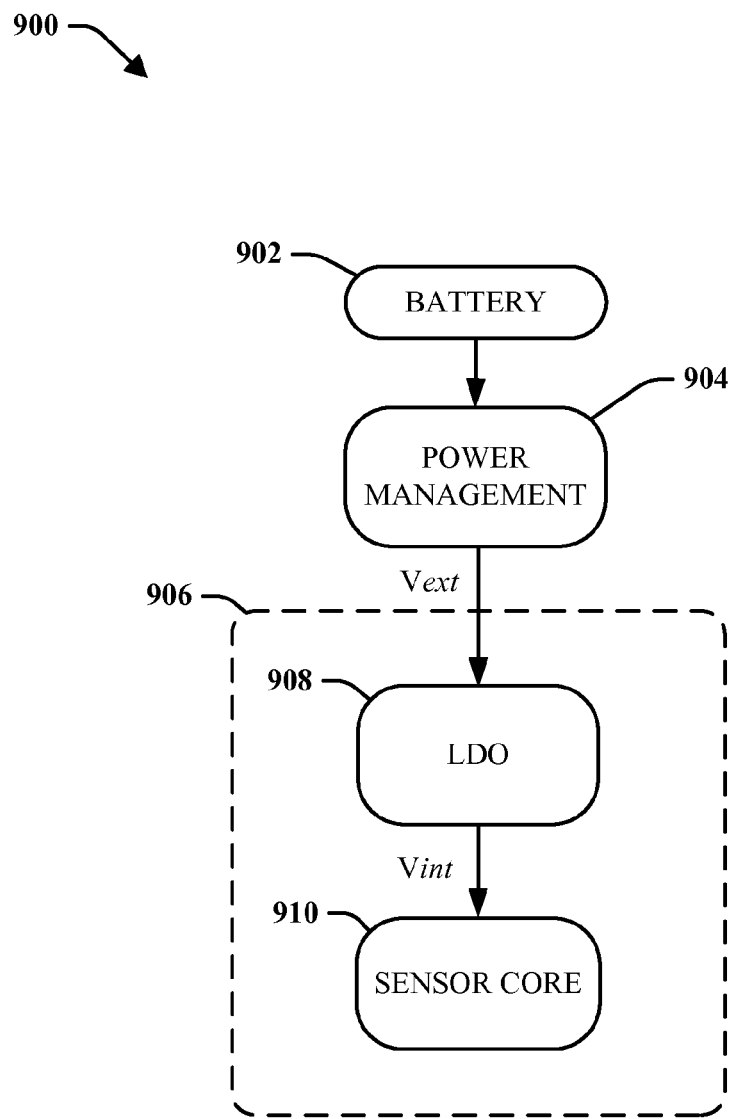
FIG. 9 depicts an example prior art of a power management system for a MEMs sensor.

In an embodiment, the aliasing frequency will be a DC offset when the switching frequency is an integer multiple of the sampling frequency. In the case of an audio signal, the signal of interest can lie substantially above the DC offset, and the DC offset can be readily eliminated using a high pass filter. Making the A/D converter voltage ripple tolerant in this way allows the use of a switching regulator on the sensor circuit board while maintaining high sensitivity. Switching regulators used in conjunction with a low-dropout regulator (LDO) can provide efficient power management even when the supply voltage is much higher than the desired output voltage. By contrast, in traditional MEMs sensors as shown in FIG. 9, the MEMs sensor 906 includes just an LDO 908 and a sensor core 910. The MEMs sensor 906 receives power from a power management component 904 and a battery 902, and the LDO 908 converts the supply voltage to a voltage appropriate for the sensor core 910. If there is a large difference between the supply voltage output by the power management component 904 and the sensor core 910 input voltage, the LDO 908 power conversion is inefficient, leading to power loss in the form of heat.

The systems and methods of the present invention can provide a closed feedback loop to efficiently convert the supply voltage to an output voltage. A controller can be provided to receive feedback based on the power output from the switching regulator, and can modulate the switching regulator to adjust the voltage of the power output. Similarly, the controller can also monitor the supply voltage and adjust the switching regulator to keep the output voltage within a predetermined range. In an embodiment the timing circuit of the MEMs sensor can act as a multiplexer which chooses between an external clock and an internal clock, depending on the mode of operation. The timing circuit may also include a frequency multiplier such as a PLL or DLL, generating multiple output clocks.

Various other configurations or arrangements are described herein. It is noted that the various embodiments can include other components and/or functionality. It is further noted that the various embodiments can be included in larger systems, including, smart televisions, smart phones or other cellular phones, wearables (e.g., watches, headphones, etc.), tablet computers, electronic reader devices (i.e., e-readers), laptop computers, desktop computers, monitors, digital recording devices, appliances, home electronics, handheld gaming devices, remote controllers (e.g., video game controllers, television controllers, etc.), automotive devices, personal electronic equipment, medical devices, industrial systems, cameras, and various other devices or fields.

Exemplary Embodiments

Various aspects or features of the subject disclosure are described with reference to the drawings, wherein like reference numerals are used to refer to like elements throughout. In this specification, numerous specific details are set forth in order to provide a thorough understanding of the subject disclosure. It should be understood, however, that the certain aspects of disclosure may be practiced without these specific details, or with other methods, components, parameters, etc. In other instances, well-known structures and devices are shown in block diagram form to facilitate description and illustration of the various embodiments.

Accordingly, FIG. 1 depicts a non-limiting schematic diagram 100 of an exemplary microelectromechanical systems (MEMS) sensor system 102 with an integrated power management system according to various non-limiting aspects of the subject disclosure. It is to be appreciated that system 100 can be used in connection with implementing one or more systems or components shown and described with reference to other figures disclosed herein. Further, it is noted that the embodiments can comprise additional components not shown for sake of brevity. Additionally, various aspects described herein may be performed by one device or two or more devices in communication with each other.

MEMS sensor system 102 can be an application specific integrated circuit that includes a sensor core 108 that receives input energy in one form and converts the energy into an electrical signal by way of a transducer. Energy types can include electrical, mechanical, electromagnetic, chemical, acoustic and thermal energy. Generally in this disclosure, reference will be made to a MEMS sensor system that converts acoustic waves into electric signal, but the principles disclosed in the subject matter herein can apply to sensors with various types of transducers. Exemplary sensors include accelerometers, gyroscope and pressure sensors.

The MEMs sensor 102 can include a switching regulator 104 that receives a power input from a power supply and converts the power to a power output at a different voltage than the power input. The switching regulator 104 can convert a power from power supply with a first voltage to a power output with a second voltage, where the second voltage is lower than a first voltage. The switching regulator 104 works by taking small chunks of energy, bit by bit, from the input voltage source, and moving them to the output. This is accomplished with the help of an electrical switch and a controller which regulates the rate at which energy is transferred to the output. Switching regulator 104 can supply a power output with relatively large voltage differentials compared to the power input at high efficiencies.

A linear regulator, in one embodiment a low dropout regulator 106, can be provided to make small adjustments to the power output from the switching regulator 104. LDO 106 can generally perform with good efficiency when the input-output voltage is around 100 mV, but larger voltage differences leads to power wasted in the form of heat. LDO 106 is therefore used to make small corrections to the power output from the switching regulator 104.

The sensor core 108 can include an analog to digital (A/D) converter 110 that converts an analog electric signal produced by a transducer into a digital electric signal by sampling the analog electric signal at a sampling rate. The result is a sequence of digital values that have been converted from a continuous-time and continuous-amplitude analog signal to a discrete-time, discrete-amplitude digital signal. The A/D converter 110 samples the analog input at a sampling rate that is determined by a timing circuit 112. The sampling rate is important since when an analog signal is sampled, and converted to digital by the A/D converter 110 at a sampling frequency $f_s$, the signal spectrum undergoes aliasing, with spectral elements at an integer multiple of $f_s$ shifting to DC, providing a DC offset to the digital signal, and spectral elements at a non-integer multiple of $f_s$ providing a frequency offset.

Inherent in the switching regulator 104 design however, voltage ripples are formed in the power output. Since the voltage ripples formed by the switching regulator 104 are spectrally rich, their presence can influence the aliasing of the A/D conversion and so the timing circuit 112 is provided to set the frequency of both the sampling frequency of the A/D converter and the switching regulator 104 so that the respective frequencies are harmonically related. The voltage ripples of the switching regulator 104 match the switching frequency determined by the timing circuit 112. The switching regulator 104 ideally uses a constant frequency modulation scheme or a narrow band frequency modulation scheme to avoid causing additional interference. Since spectral elements at an integer multiple of $f_s$ shift to a DC offset, when the switching frequency is harmonically related to the sampling frequency, the voltage ripples will shift to DC when aliased. The signal of interest, which is being detected by the sensor core 108, will likely lie substantially above the DC, the resulting offset does not cause degradation or interference with the signal of interest, and can be readily eliminated using a high pass filter. In an embodiment, the sensor core 108 can include the high pass filter that removes the offset in the signal produced by the A/D converter 110, and provide a data output of the digital electric signal with the DC offset removed. In another embodiment, a digital high pass filter separate from the MEMs sensor 102 can remove the offset from the digital signal produced by the MEMs sensor 102. In the embodiment shown in FIG. 1, the switching regulator is open loop in that the timing circuit 112 controls the switching frequency and the sampling frequency based solely on the clock signals from the oscillator 114 and/or the external clock, without any feedback from the output of the switching regulator 104 or the power supply. In other embodiments (e.g., FIG. 2), a closed loop system can be provided.

In an embodiment, the sampling frequency and the switching frequency $f_r$ can be integer multiples of each other. In an embodiment, the aliasing frequency $f_{alias}$ can be provided by the following formula $f_{alias}=kf_s-mf_r$, where k,m=±1, ±2, . . . . In an embodiment when the sensor is a microphone, the sampling frequency and the switching frequency can be chosen such that that aliasing frequency is equal to zero, which corresponds to DC.

In an embodiment, the switching regulator 104 can use a constant frequency modulation scheme such as digital capacitance modulation. In other embodiments, the switching regulator 104 can use a narrow band frequency modulation scheme such as pulse width modulation. Constant frequency modulation schemes and narrow band frequency modulation schemes are preferable as frequency modulation can cause interference with the signal of interest.

In an embodiment, timing circuit 112 can receive a clock signal from an external source. In other embodiments, timing circuit 112 can receive a clock signal from an oscillator 114 on the MEMs sensor system 102. The timing circuit 112 can multiplex the timing signals from the external clock and the oscillator 114 and the timing circuit 112 or the switching regulator 104 can choose between the signals from the oscillator 114 or the external clock depending on the mode of operation. The timing circuit 112 may also include a frequency multiplier such as a phase-locked loop (PLL) or delay-locked loop (DLL), generating multiple output clocks. A PLL is a control system that generates an output signal whose phase is related to the phase of an input signal and a DLL is similar to the PLL but doesn't have an internal voltage controlled oscillator, which is replaced by a delay line.

Figure 2:
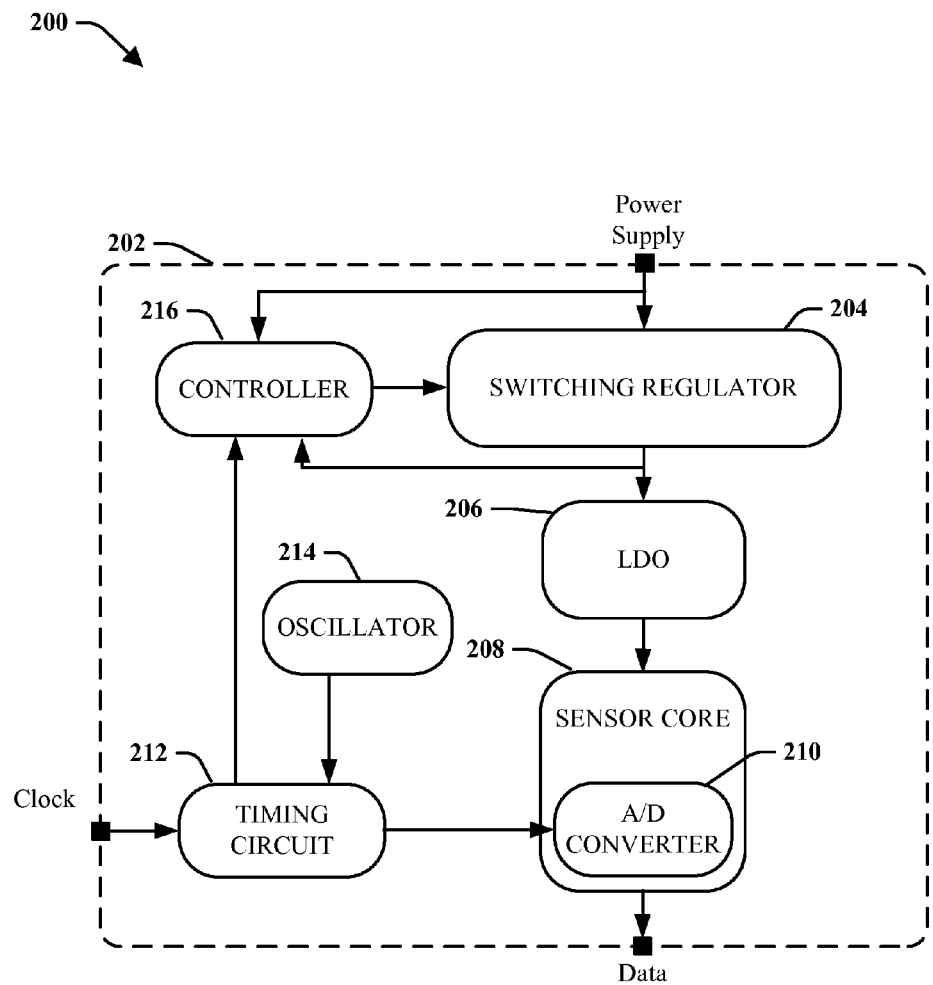
FIG. 2 depicts a non-limiting schematic diagram of an exemplary MEMS sensor system with a closed loop integrated power management system according to various non-limiting aspects of the subject disclosure.

Turning now to FIG. 2, illustrated is a schematic diagram 200 of an exemplary MEMS sensor system 202 with a closed loop integrated power management system according to various non-limiting aspects of the subject disclosure. It is to be appreciated that system 200 can be used in connection with implementing one or more systems or components shown and described with reference to other figures disclosed herein. Further, it is noted that the embodiments can comprise additional components not shown for sake of brevity. Additionally, various aspects described herein may be performed by one device or two or more devices in communication with each other.

MEMS sensor system 202 can include a sensor core 208 that receives input energy in one form and converts the energy into an electrical signal using a transducer. Energy types can include electrical, mechanical, electromagnetic, chemical, acoustic and thermal energy. The MEMs sensor 202 can include a switching regulator 204 that receives a power input from a power supply and converts the power to a power output at a different voltage than the power input. The switching regulator 204 can convert a power from power supply with a first voltage to a power output with a second voltage.

An LDO 206, can be provided to make small adjustments to the power output from the switching regulator 204. LDO 206 can generally perform with good efficiency when the input-output voltage is around 100 mV, but larger voltage differences leads to power wasted in the form of heat. LDO 206 is therefore used to make small corrections to the power output from the switching regulator 204.

The sensor core 208 can include an analog to digital (A/D) converter 210 that converts an analog electric signal produced by a transducer into a digital electric signal by sampling the analog electric signal at a sampling rate. The sampling rate is determined by a timing circuit 212 that bases the timing signals on either a oscillator 214 or an external clock.

In an embodiment, the sampling frequency and the switching frequency $f_r$ can be integer multiples of each other or otherwise harmonically related. In an embodiment, the aliasing frequency $f_{alias}$ can be provided by the following formula $f_{alias}=kf_s-mf_r$, where k,m=±1, ±2, . . . . In an embodiment when the sensor is a microphone, the sampling frequency and the switching frequency can be chosen such that that aliasing frequency is equal to zero, which corresponds to a DC offset.

In an embodiment, a controller 216 can be provided to receive feedback based on the power output and manage the switching regulator to adjust the second voltage of the power output. In an embodiment, the controller 216 can also monitor the power supply, and adjust a conversion ratio of the switching regulator based on the power supply. The switching regulator 204 can convert the incoming power supply into a power output in a number of different conversion ratios based on the internal configuration of the switching regulator. If the voltage of the power supply changes, the controller can adjust the switching regulator 204 configuration as needed.

Environmental conditions such as temperature in addition to load current and other factors may have an effect on the switching regulator 204's efficiency and voltage conversion. The controller 216 can monitor the output of the switching regulator 204 and make corrections to the switching regulator 204 in response to the output changing.

In some embodiments, the controller 216 can also monitor the frequency of voltage ripples, and adjust the switching frequency so that the voltage ripple frequency is harmonically related to the sampling frequency. This is particularly useful when there may be factors which cause the frequency of the voltage ripples to differ from the switching frequency. In this case, the switching frequency can be adjusted so that voltage ripple frequency is harmonically related (e.g., an integer multiple of) to the sampling frequency, even if the switching frequency is not directly harmonically related to the sampling frequency. In an embodiment, the controller 216 can send an instruction to the timing circuit 212 to adjust the switching frequency based on the feedback received from the output of the switching regulator 204.

In various embodiments, the MEMs sensor systems 202 and 102 can employ power/energy harvesting to provide power for the sensor systems 202 and 102. Power can be picked up from the environment, and can be supplied as an input to switching regulator 204 and/or 104. A charge bump can also be included to increase the voltage of the power supply in cases when the power supply has a voltage lower than the voltage required by the sensor core 208.

Figure 3:
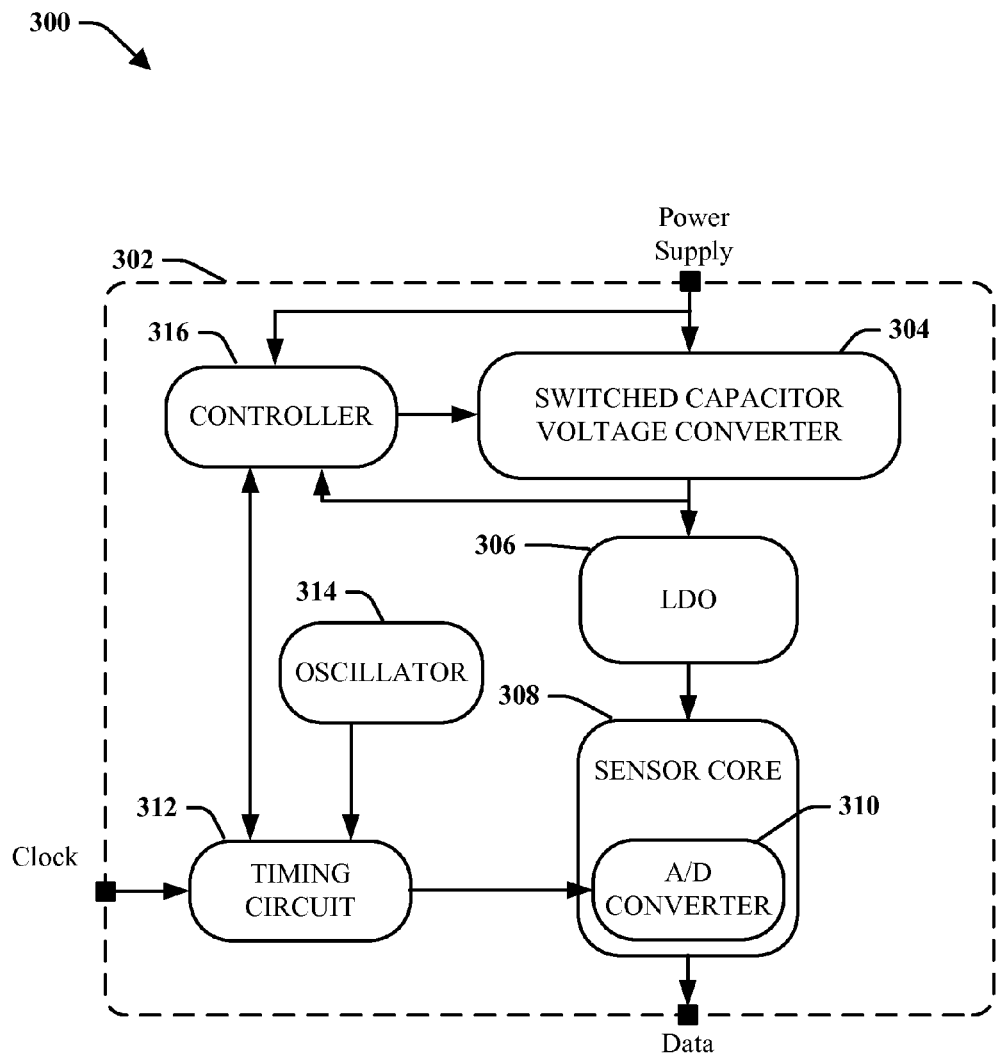
FIG. 3 depicts a non-limiting schematic diagram of an exemplary MEMS sensor system with a closed loop integrated power management system according to various non-limiting aspects of the subject disclosure.

Turning now to FIG. 3, illustrated is a schematic diagram 300 of an exemplary MEMS sensor system 302 with a closed loop integrated power management system according to various non-limiting aspects of the subject disclosure.

MEMS sensor system 302 can include a sensor core 308 that receives input energy in one form and converts the energy into an electrical signal using a transducer. The MEMs sensor 302 can include a switching regulator, in this case a switched capacitor voltage converter 304, that receives a power input from a power supply and converts the power to a power output at a different voltage than the power input. The switched capacitor voltage converter 304 can convert a power from power supply with a first voltage to a power output with a second voltage. An LDO 306, can be provided to make small adjustments to the power output from the switched capacitor voltage converter 304.

The sensor core 308 can include an analog to digital (A/D) converter 310 that converts an analog electric signal produced by a transducer into a digital electric signal by sampling the analog electric signal at a sampling rate. The sampling rate is determined by a timing circuit 312 that bases the timing signals on either an oscillator 314 or an external clock.

In an embodiment, a controller 316 can be provided to receive feedback based on the power output and manage the switched capacitor voltage converter 304 to adjust the second voltage of the power output. In an embodiment, the controller 316 can also monitor the power supply, and adjust a conversion ratio of the switching regulator based on the power supply. The switched capacitor voltage converter 304 can convert the incoming power supply into a power output in a number of different conversion ratios based on the internal configuration of the switched capacitor voltage converter 304. If the voltage of the power supply changes, the controller can adjust the switched capacitor voltage converter 304 configuration as needed.

Environmental conditions such as temperature in addition to load current and other factors may have an effect on the switched capacitor voltage converter 304's efficiency and voltage conversion. The controller 316 can monitor the output of the switched capacitor voltage converter 304 and make corrections to the switched capacitor voltage converter 304 in response to the output changing.

In an embodiment, the switched capacitor voltage converter 304 can use a constant frequency modulation scheme such as digital capacitance modulation. In other embodiments, the switched capacitor voltage converter 304 can use a narrow band frequency modulation scheme such as pulse width modulation. Constant frequency modulation schemes and narrow band frequency modulation schemes are preferable as frequency modulation can cause interference with the signal of interest.

Figure 4:
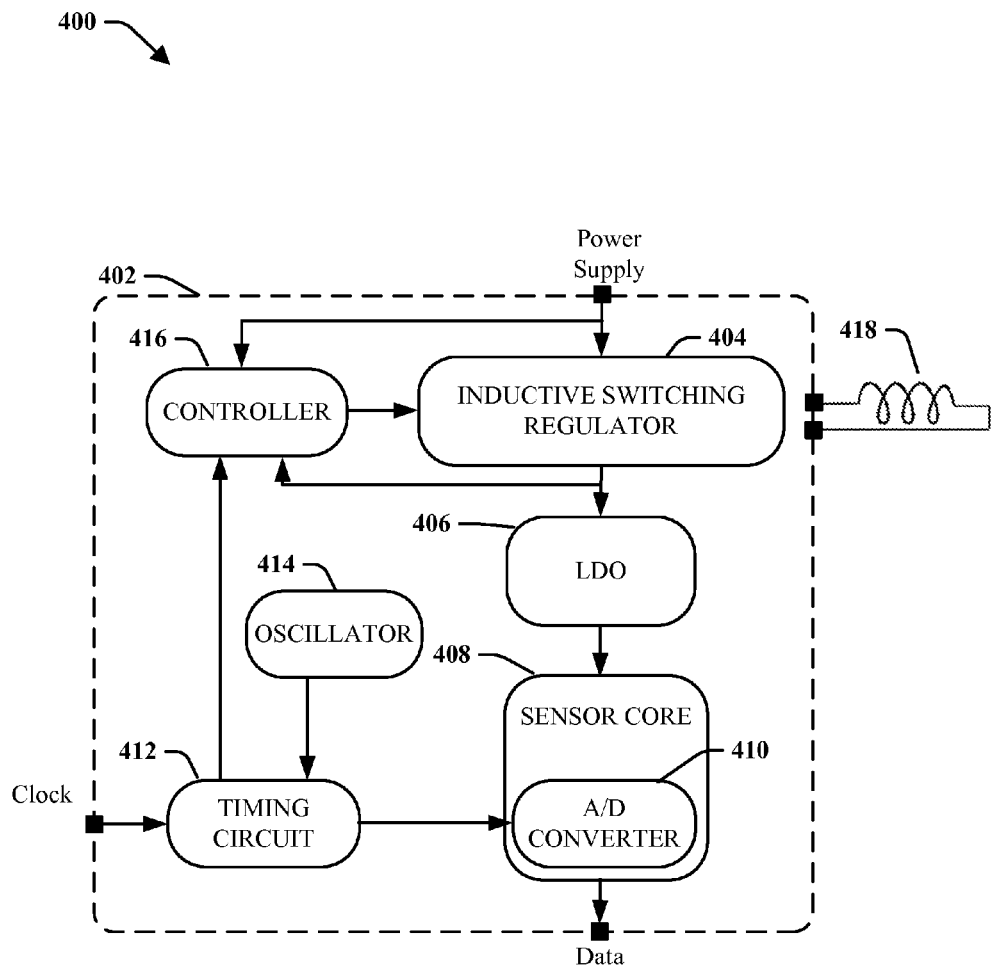
FIG. 4 depicts a non-limiting schematic diagram of an exemplary MEMS sensor system with a closed loop integrated power management system according to various non-limiting aspects of the subject disclosure.

Turning now to FIG. 4, illustrated is a schematic diagram 400 of an exemplary MEMS sensor system 402 with a closed loop integrated power management system according to various non-limiting aspects of the subject disclosure.

MEMS sensor system 402 can include a sensor core 408 that receives input energy in one form and converts the energy into an electrical signal using a transducer. The MEMs sensor 402 can include a switching regulator, in this case a inductive switching regulator 404, that receives a power input from a power supply and converts the power to a power output at a different voltage than the power input. The inductive switching regulator 404 can convert a power from power supply with a first voltage to a power output with a second voltage. An LDO 406 can be provided to make small adjustments to the power output from the switched capacitor voltage converter 404. The inductive switching regulator 404 can include an induction loop 418

The sensor core 408 can include an analog to digital (A/D) converter 410 that converts an analog electric signal produced by a transducer into a digital electric signal by sampling the analog electric signal at a sampling rate. The sampling rate is determined by a timing circuit 412 that bases the timing signals on either an oscillator 414 or an external clock.

In an embodiment, a controller 416 can be provided to receive feedback based on the power output and manage the inductive switching regulator 404 to adjust the second voltage of the power output. In an embodiment, the controller 416 can also monitor the power supply, and adjust a conversion ratio of the switching regulator based on the power supply. The inductive switching regulator 404 can convert the incoming power supply into a power output in a number of different conversion ratios based on the internal configuration of the inductive switching regulator 404. If the voltage of the power supply changes, the controller 416 can adjust the inductive switching regulator 404 configuration as needed.

In an embodiment, the inductive switching regulator 404 can use a narrow band frequency modulation scheme such as pulse width modulation. Nearly constant frequency modulation schemes or narrow band frequency modulation schemes are preferable as frequency modulation can cause interference with the signal of interest.

It is to be appreciated that in the open and closed loop systems shown in FIGS. 1-4, an LDO is present in each of the MEMs sensors. In other embodiments, the MEMs sensors and ASICs can perform the power management with just a switching regulator and no LDO.

Figure 5:
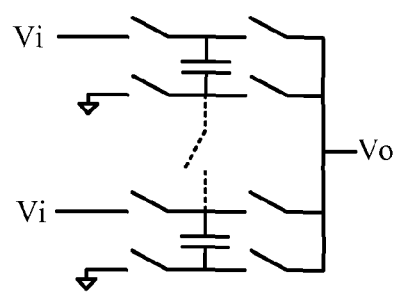
FIG. 5 depicts a non-limiting circuit diagram of an exemplary switched capacitors voltage converter according to various non-limiting aspects of the subject disclosure.
Figure 5:
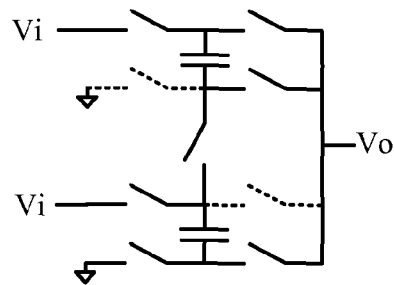
Figure 5:
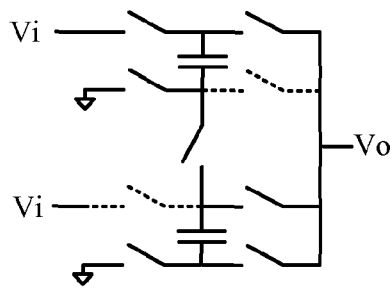

Turning now to FIG. 5 illustrated is a circuit diagram 500 of an exemplary switched capacitors voltage converter according to various non-limiting aspects of the subject disclosure. In particular, FIG. 5 displays a switched capacitors voltage converter at different conversion ratios. At 502, the conversion ratio is n=½, where the output voltage is half the supply voltage. At 504, the conversion ratio is n=⅔, where the output voltage is ⅔ the supply voltage, and at 506, the conversion ratio is n=⅓, where the output voltage is ⅓ the supply voltage. These different conversion ratios are reached by modulating which switches are open and closed. Specifically, in each of the images, the switches that are dotted are open, while the other switches are closed.

In an embodiment, the switched capacitors voltage converter can change the conversion ratio from a first ratio to a second ratio. This can be done in response to a changing supply voltage, or a changing desired output voltage. For instance, if the external supply is between 1.8V and 2.4V, the controller may choose a conversion ratio of ⅔ to generate an output of at least 1.2V, and if the external voltage exceeds 2.4V, it may use a ratio of ½ to achieve the 1.2V. If the external voltage is 2.6V, the ratio of ½ can be applied, and an LDO can be used to convert the 1.3V to 1.2V as needed. In some embodiments, the conversion ratio can be selected to output a voltage under the input voltage, while in other embodiments, the conversion ratio can be selected to output a voltage that is above the input voltage. In these embodiments, charge pumps, which are switched capacitors switching regulators that increase voltage, and boost regulators, which are inductive switching regulators that increase voltage, can be used.

In an embodiment, the switched capacitors voltage converter can adjust the conversion ratio in response to determining that the supply voltage has changed, and in other embodiments, a controller can monitor the supply voltage and the output voltage and send an instruction to the switched capacitors voltage converter to change the conversion ratio accordingly.

Figure 6:
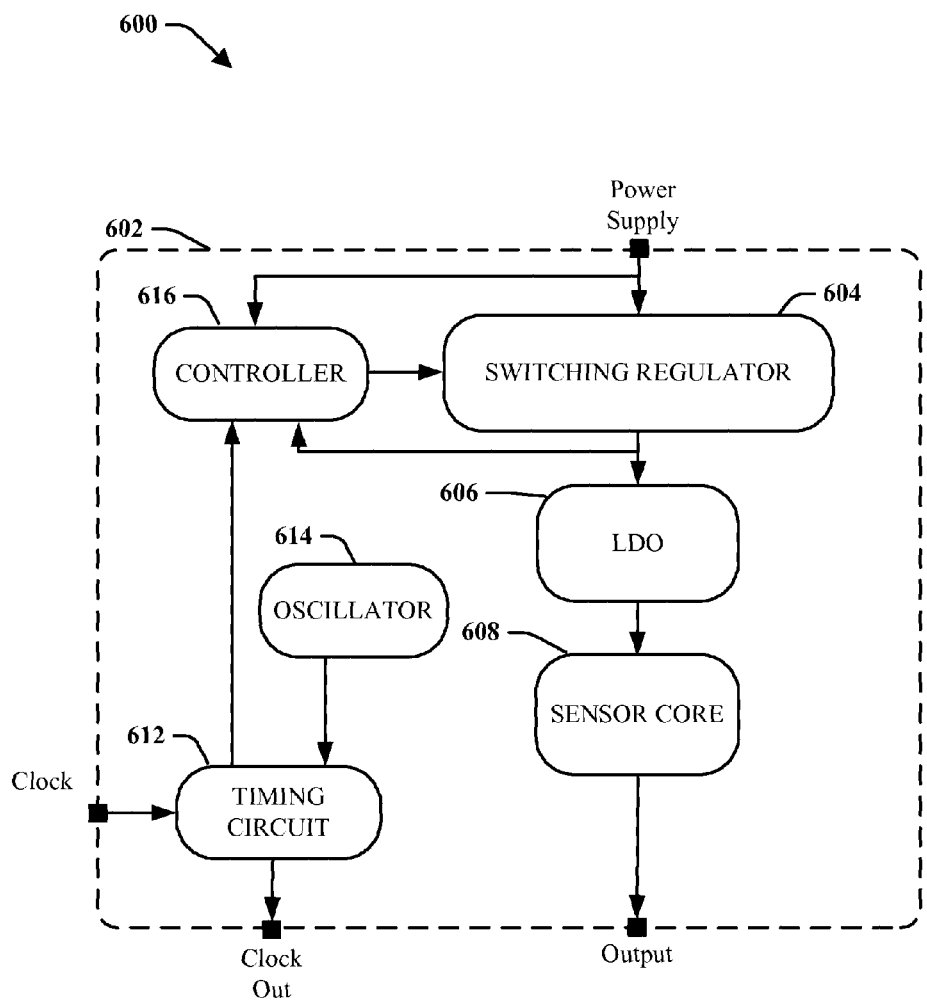
FIG. 6 depicts a non-limiting schematic diagram of an exemplary MEMS sensor system with a closed loop integrated power management system according to various non-limiting aspects of the subject disclosure.

Turning now to FIG. 6, illustrated is a schematic diagram 600 of an exemplary MEMS sensor system 602 with a closed loop integrated power management system according to various non-limiting aspects of the subject disclosure. In FIG. 6, an embodiment of the subject disclosure is shown where the MEMs sensor 602 and sensor core 608 output an analog electric signal without sampling. The sensor core 608 can include the transducer which converts acoustic energy into an electric signal, but then outputs the resulting analog signal without A/D conversion. The timing circuit 612 still sends a clock signal with a switching frequency to the controller 616 and switching regulator 604, but can output a clock with the sampling frequency. An external A/D converter (not shown) can then receive the sampling frequency from the timing circuit 612 and the analog electric signal from the sensor core 608 and perform the sampling with the correctly calibrated aliasing frequency resulting in a DC offset. The oscillator 614, controller 616, switching regulator 604, and LDO 606 can perform the same or similar functions as described in earlier embodiments, (e.g., FIG. 2).

While several example embodiments are provided, it is noted that aspects of this disclosure are not limited to the exemplary embodiments. As such, the various embodiments disclosed herein can be applied to numerous applications. In exemplary embodiments, systems and methods described herein can be applied to smart phones, hand held gaming devices, hand held electronics, notebook computers, desktop computers, and the like. Such systems can utilize aspects disclosed herein to determine characteristics associated with acoustic signals, such as for speech recognition, pressure detection, or the like.

Figure 7:
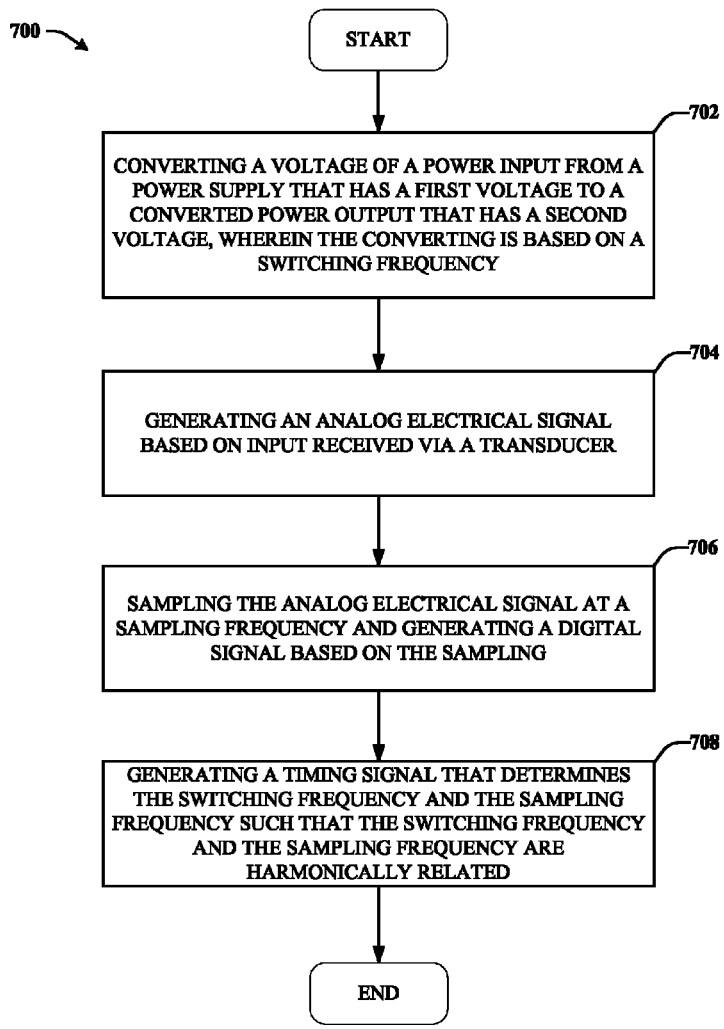
FIG. 7 depicts an exemplary flowchart of non-limiting methods associated with a performing analog to digital conversion in a MEMS sensor according to various non-limiting aspects of the disclosed subject matter.
Figure 8:
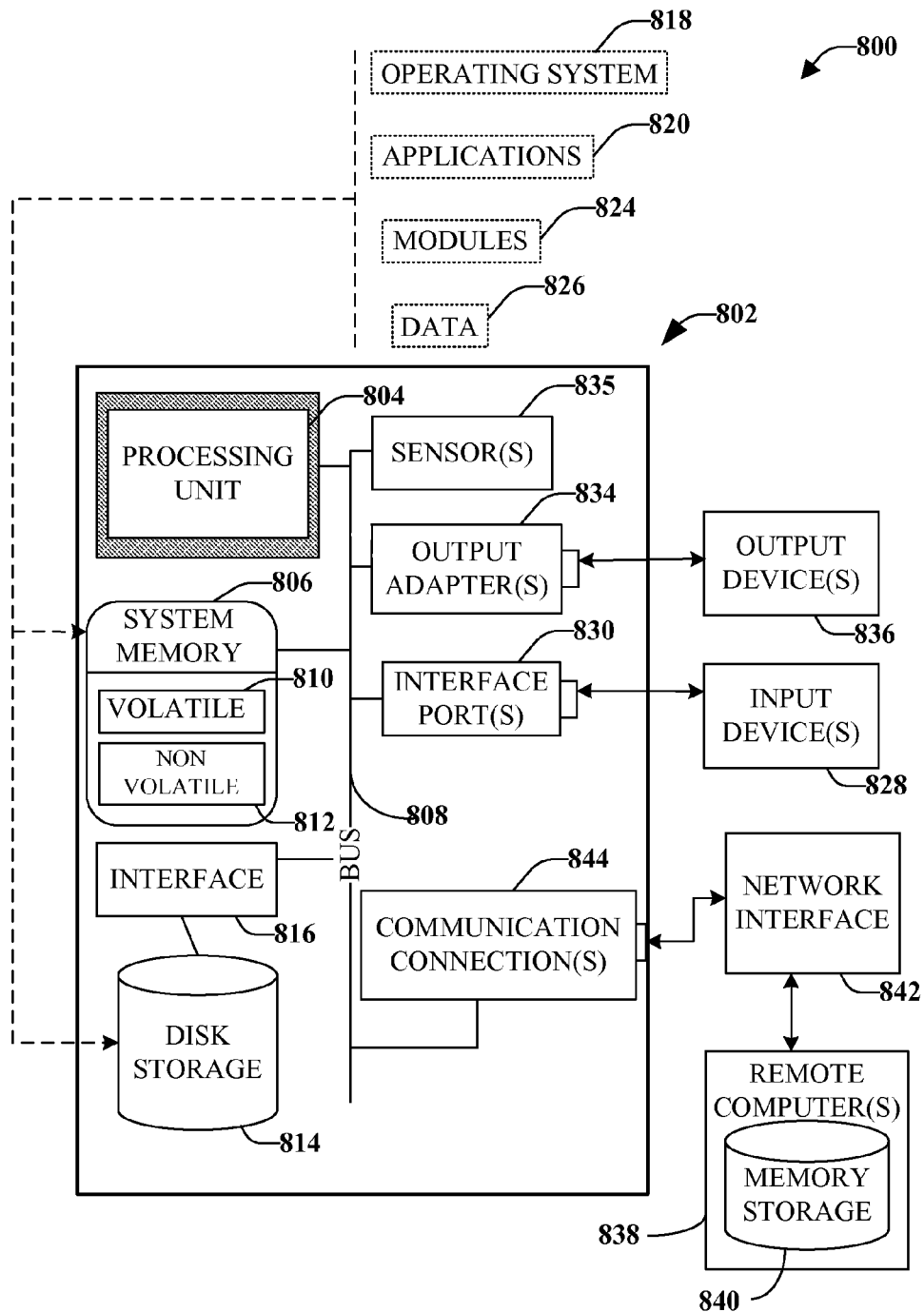
FIG. 8 depicts an example schematic block diagram for a computing environment in accordance with certain embodiments of this disclosure.

In view of the subject matter described supra, methods that can be implemented in accordance with the subject disclosure will be better appreciated with reference to the flowcharts of FIGS. 7-8. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methods described hereinafter.

Exemplary Methods

FIG. 7 depicts an exemplary flowchart of non-limiting methods associated with a performing analog to digital conversion in a MEMS sensor according to various non-limiting aspects of the disclosed subject matter. As a non-limiting example, exemplary method 700 can facilitate performing analog to digital conversions of electric signals in MEMS sensors with integrated power management systems (e.g., system 100, 200, etc.).

Method 700 can begin at 702, where the method includes converting a voltage of a power input from a power supply that has a first voltage to a converted power output that has a second voltage (e.g., by switching regulator 104, 204, etc), wherein the converting is based on a switching frequency. The switching frequency can be received from a timing circuit that generates a clock signal based on an external clock or an oscillator on the ASIC. The switching regulator can convert the supply voltage into an output voltage based on a selected conversion ratio. The conversion ratio can be adjusted in response to a change in a desired output voltage, or a change in the supply voltage.

The method can continue at 704, where the method includes generating an analog electrical signal based on input received via a transducer (e.g., by sensor core 108, 208, etc.) The transducer works by receiving input energy in one form and converts the energy into an electrical signal. Energy types can include electrical, mechanical, electromagnetic, chemical, acoustic and thermal energy.

The method can continue at 706, where the method includes sampling the analog electrical signal at a sampling frequency and generating a digital signal based on the sampling (e.g., by A/D converter 110, 210, etc.). The A/D converter converts an analog electrical signal produced by the transducer into a digital electric signal by sampling the analog electrical signal at a sampling rate. The result is a sequence of digital values that have been converted from a continuous-time and continuous-amplitude analog signal to a discrete-time, discrete-amplitude digital signal.

The method can continue at 708, where the method includes generating a timing signal that determines the switching frequency and the sampling frequency such that the switching frequency and the sampling frequency are harmonically related (e.g., by timing circuit 112, 212, etc.). The sampling rate is important since when an analog signal is sampled, and converted to digital by the A/D converter at a sampling frequency $f_s$, the signal spectrum undergoes aliasing, with spectral elements at an integer multiple of $f_s$ shifting to DC, providing a DC offset to the digital signal, and spectral elements at a non-integer multiple of $f_s$ providing a frequency offset. Since the voltage ripples formed by the switching regulator are spectrally rich, their presence can influence the aliasing of the A/D conversion and so the timing circuit is provided to set the frequency of both the sampling frequency of the A/D converter and the switching regulator so that the respective frequencies are harmonically related. The voltage ripples of the switching regulator match the switching frequency determined by the timing circuit. Since spectral elements at an integer multiple of $f_s$ shift to a DC offset, when the switching frequency is harmonically related to the sampling frequency, the voltage ripples will offset to DC when aliased.

Exemplary Operating Environment

The systems and processes described herein can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 8, a suitable environment 800 for implementing various aspects of the claimed subject matter includes a computer 802. The computer 802 includes a processing unit 804, a system memory 806, sensor(s) 835 (e.g., the MEMS sensor system 102, 202, etc.), and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. In addition, according to present innovations, sensor(s) 835 may include at least one audio sensor (e.g., sensor core 108, 208, etc.). In an embodiment, the processing unit 804 and or system memory can process and/or receive a digital signal received from the sensor 835 (e.g., from MEMs sensor 102, 202, etc.). In other embodiments, the processing unit 804 can perform sampling on an analog signal received from the sensor 835 (e.g., MEMs sensor 602) using a clock signal received from the sensor 835. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM).

Computer 802 may also include removable/non-removable, volatile/non-volatile computer storage medium. FIG. 8 illustrates, for example, disk storage 814. Disk storage 814 includes, but is not limited to, devices like a magnetic disk drive, solid state disk (SSD) floppy disk drive, tape drive, Jaz drive, Zip drive, LS-100 drive, flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816. It is appreciated that storage devices 814 can store information related to a user. Such information might be stored at or provided to a server or to an application running on a user device. In one embodiment, the user can be notified (e.g., by way of output device(s) 836) of the types of information that are stored to disk storage 814 and/or transmitted to the server or application. The user can be provided the opportunity to control having such information collected and/or shared with the server or application (e.g., by way of input from input device(s) 828).

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802 and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present disclosure. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. An application specific integrated circuit, comprising:
   a switching regulator that receives a power supply at a first voltage and outputs a power output at a second voltage different than the first voltage;
   an analog to digital converter that converts an analog electrical signal into a digital signal, wherein the analog to digital converter receives the power output via the switching regulator; and
   a timing circuit that controls a switching frequency of the switching regulator and a sampling frequency of the analog to digital converter such that the switching frequency and sampling frequency are harmonically related.

2. The application specific integrated circuit of claim 1, further comprising:
   a low dropout regulator that regulates the second voltage of the power output.

3. The application specific integrated circuit of claim 1, further comprising:
   a controller that receives feedback based on the power output and manages the switching regulator to adjust the second voltage of the power output.

4. The application specific integrated circuit of claim 3, wherein the controller monitors the power supply, and changes a conversion ratio of the switching regulator in response to a change in the first voltage of the power supply.

5. The application specific integrated circuit of claim 1, wherein the timing circuit receives a timing signal from an oscillator.

6. The application specific integrated circuit of claim 1, wherein the timing circuit receives the timing signal from an external clock.

7. The application specific integrated circuit of claim 1, wherein the timing circuit selects timing signals from at least one of an external clock and an oscillator.

8. The application specific integrated circuit of claim 1, wherein an aliasing frequency formed by a function of the sampling frequency and the switching frequency is outside a predetermined range of frequencies associated with the analog electrical signal.

9. The application specific integrated circuit of claim 1, further comprising a transducer.

10. The application specific integrated circuit of claim 9, wherein the transducer can be any one of a MEMs acoustic sensor, a MEMS accelerometer, a pressure sensor and a MEMS gyroscope.

11. The application specific integrated circuit of claim 1, wherein the switching regulator is an inductive switching regulator.

12. The application specific integrated circuit of claim 1, wherein the switching regulator is a switched capacitors voltage converter.

13. The application specific integrated circuit of claim 1, wherein the switching regulator operates in an open loop.

14. The application specific integrated circuit of claim 1, wherein the switching regulator uses a constant-frequency modulation scheme.

15. The application specific integrated circuit of claim 14, wherein the constant-frequency modulation is digital capacitance modulation.

16. The application specific integrated circuit of claim 1, wherein the switching regulator uses a narrow band frequency modulation scheme.

17. The application specific integrated circuit of claim 16, wherein the narrow band frequency modulation scheme is a pulse width modulation scheme.

18. The application specific integrated circuit of claim 1, wherein the switching frequency is an integer multiple of the sampling frequency.

19. The application specific integrated circuit of claim 1, wherein the sampling frequency is an integer multiple of the switching frequency.

20. A method, comprising:
    converting a voltage of a power input from a power supply that has a first voltage to a converted power output that has a second voltage, wherein the converting is based on a switching frequency;
    generating an analog electrical signal based on input received via a transducer;
    sampling the analog electrical signal at a sampling frequency and generating a digital signal based on the sampling; and
    generating a timing signal that determines the switching frequency and the sampling frequency such that the switching frequency and the sampling frequency are harmonically related.

21. The method of claim 20, further comprising:
    adjusting the converted power output to a third voltage with a low dropout regulator.

22. The method of claim 20, further comprising:
    measuring the second voltage of the converted output, and adjusting the converting based on a results of the measuring.

23. The method of claim 20, further comprising:
    monitoring the first voltage of the power input and adjusting a conversion ratio of a switching regulator in response to a change in the first voltage satisfying a predetermined criterion.

24. The method of claim 20, further comprising:
    generating the timing signal based on an oscillator.

25. The method of claim 20, further comprising:
    generating the timing signal based on an external clock.

26. The method of claim 20, wherein the determining the switching frequency and the sampling frequency further comprises:
    setting a ratio of switching frequency to sampling frequency such that aliasing of a signal spectrum of the analog electrical signal results in a direct current offset.

27. The method of claim 20, setting a ratio of switching frequency to sampling frequency such that an aliasing frequency formed by a function of the sampling frequency and the switching frequency is outside a predetermined range of frequencies associated with the analog electrical signal.

28. The method of claim 20, wherein the switching frequency is an integer multiple of the sampling frequency.

29. The method of claim 20, wherein the sampling frequency is an integer multiple of the switching frequency.

30. A micro-electromechanical systems (MEMS) sensor comprising:
- a transducer that generates an analog electrical signal based on input energy;
- a switching regulator that receives a power supply at a first voltage and outputs a power output at a second voltage different than the first voltage;
- a timing circuit that controls a switching frequency of the switching regulator and generates a clock output for synchronous sampling, where a sampling frequency of the clock output is such that the switching frequency is an integer multiple of the sampling frequency; and
- a pair of ports to output the clock output and the analog electrical signal.

31. The MEMs sensor of claim 30, further comprising:
- a controller that receives feedback based on the power output and manages the switching regulator to adjust the second voltage of the power output.

32. The MEMs sensor of claim 30, wherein the timing circuit determines a ratio of switching frequency to sampling frequency such that aliasing of a signal spectrum of the analog electrical signal is a direct current offset.

* * * * *